United States Patent [19]
Toda

[11] 4,453,242
[45] Jun. 5, 1984

[54] SURFACE ACOUSTIC WAVE CUTTERHEAD FOR DISC RECORDING HAVING A CIRCULAR TRANSDUCER

[75] Inventor: Minoru Toda, Princeton Junction, N.J.

[73] Assignee: RCA Corporation, New York, N.Y.

[21] Appl. No.: 397,892

[22] Filed: Jul. 13, 1982

[51] Int. Cl.³ .......................... G11B 3/00; H04R 17/04
[52] U.S. Cl. ................................ 369/132; 310/313 R; 310/313 B; 310/328
[58] Field of Search ................................. 369/132–135, 369/136, 137; 310/313 R, 313 B, 328

[56] References Cited

U.S. PATENT DOCUMENTS

| | | | |
|---|---|---|---|
| 3,842,194 | 10/1974 | Clemens | 178/6.6 A |
| 4,035,590 | 7/1977 | Halter | 179/100.41 |
| 4,281,407 | 7/1981 | Tosima | 369/130 |

*Primary Examiner*—Aristotelis M. Psitos
*Attorney, Agent, or Firm*—E. M. Whitacre; W. H. Meise; J. E. Roehling

[57] ABSTRACT

A surface acoustic wave record stylus is constructed from a support having a surface for propagating surface acoustic waves. A circular-shaped interdigital transducer launches the surface acoustic waves onto the support surface. The shape of the interdigital transducer is such that the surface acoustic waves are focused to a diamond stylus positioned at the center of the circular transducer.

19 Claims, 14 Drawing Figures

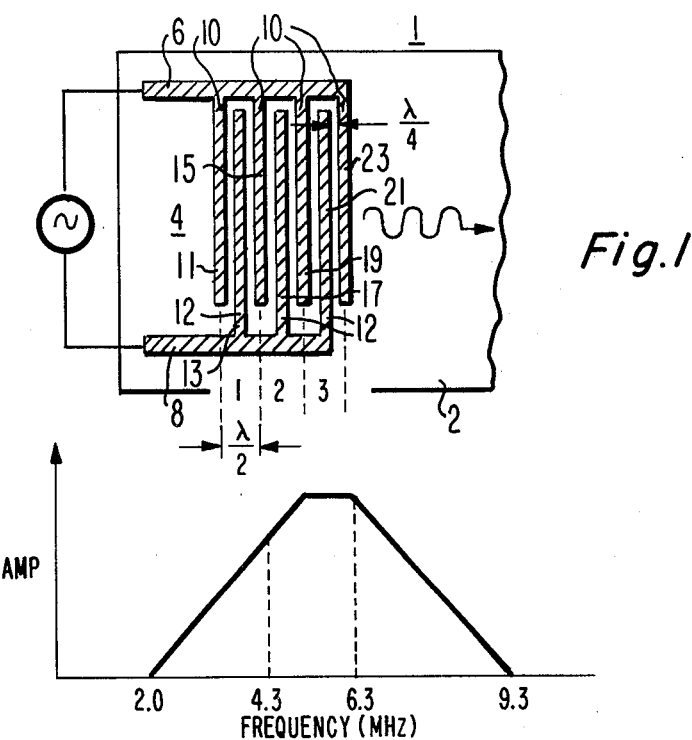
Fig. 1
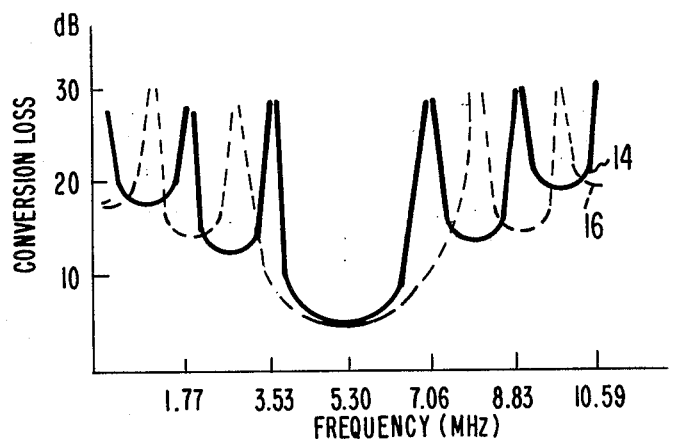
Fig. 2
Fig. 3

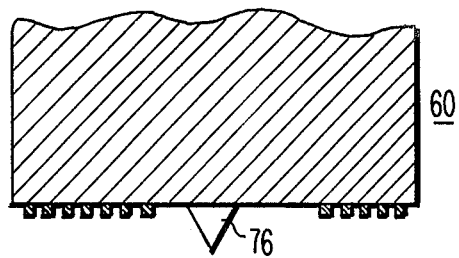
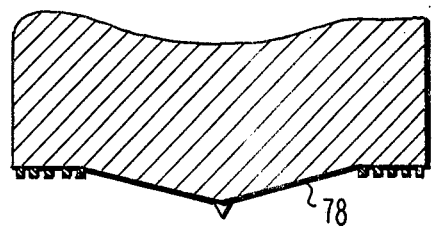
Fig.7    Fig.8
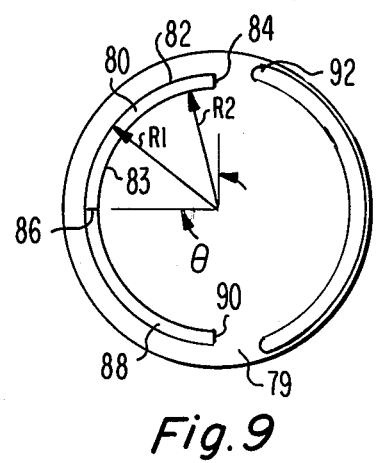
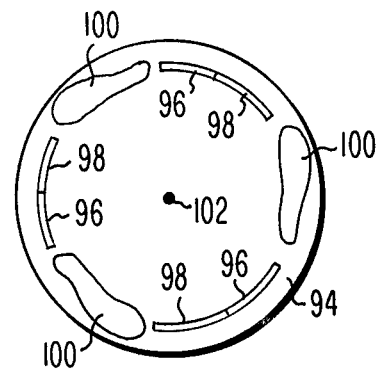
Fig.9    Fig.10
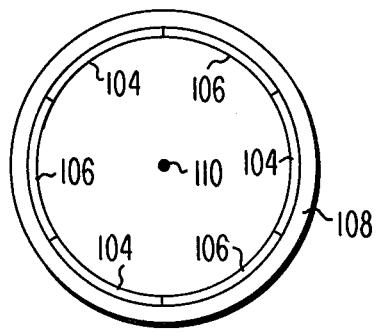
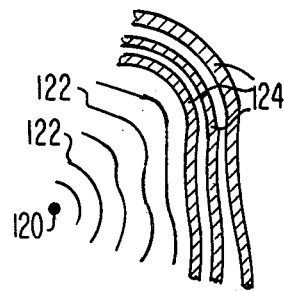
Fig.11    Fig.12

SURFACE ACOUSTIC WAVE CUTTERHEAD FOR DISC RECORDING HAVING A CIRCULAR TRANSDUCER

The present invention relates generally to surface acoustic wave devices and, more particularly, to surface acoustic wave devices for recording high density information on a record medium.

A variety of approaches for recording information into a record medium exists in the prior art. For example, laser beam and electron beam techniques are described wherein the information is recorded into a photoresist, or the like, layer which is formed on the top surface of a record medium. Further, electromechanical processes are described wherein a diamond stylus driven by a piezoelectric element is used to cut a relief pattern representative of the recorded information in the top surface of a record medium.

Although it has been shown that optical and electron beam techniques provide good results in producing record masters which may be used in the replication of disc records, these techniques have certain drawbacks. In the case of electron beam recording, for example, the recording operation must be performed in a controlled environment, i.e., a vacuum, which makes the mastering operation more difficult. Another problem results from the use of a photoresist or similar medium for the recording layer. The photoresist coating requires careful processing to maintain a uniform coating across the surface of the record medium. Further, the photoresist material requires several processing steps. First, the surface of the record medium must be prepared, second, the photoresist must be coated on the prepared surface with a uniform thickness, third, the record medium must be exposed with the laser beam or electron beam, and fourth, the exposed areas of the photoresist must be removed to finally provide a surface that may be replicated.

An electromechanical recording technique for recording video signals in a metal master is described in U.S. Pat. No. 4,035,590 issued to J. B. Halter on July 12, 1977, entitled APPARATUS FOR ELECTROMECHANICAL RECORDING OF SHORT WAVELENGTH MODULATION IN A METAL MASTER. According to Halter an unheated cutting stylus (e.g., of diamond) is positioned in a recording position with respect to a metal master to cut a groove having a quiescent groove depth. The stylus is driven by a piezoelectric element driven in consonance with the signal which is to be recorded on the surface of the metal master.

In one preferred electromechanical recording technique a thin plate of piezoelectric ceramic vibrates in the thickness mode and a diamond stylus affixed to the ceramic plate cuts into the surface of a copper master. The bandwidth of the video signal to be recorded is approximately 10 MHz. To accommodate this bandwidth the size of the cutterhead including the piezoelectric element and stylus must be very small. For example, a cutterhead designed to cut video signals at half a real time rate will have length and width dimensions for the combined stylus and piezoelectric element of roughly 200 micrometers. At real time the wavelength of the signal to be recorded becomes so short that the cutterhead must be dimensioned at approximately one-half of the aforementioned dimensions. For this reason it is difficult to make an electromechanical cutterhead for cutting video signals at real time. First of all, a smaller cutterhead is difficult to construct. Further, with respect to a real time cutterhead, the maximum voltage which is supplied to the cutterhead should be reduced because excessive heating may lead to thermal breakdown and depolarization of the piezoelectric element. To produce the vibration amplitudes necessary for video discs the signal voltage, in general, must be maintained at the voltage for half rate even if the thickness of the ceramic is reduced for the real time design. This is required because the vibrational amplitude is not proportional to the electric field but to the voltage applied. Therefore, the real time device may suffer depolarization or thermal runaway due to the high field applied to the small device.

Recently, it has been demonstrated that video disc type records may be mastered using a stylus structure wherein surface acoustic waves, rather than bulk waves, effect the cutting action of the stylus tip. In U.S. Pat. No. 4,281,407 issued to S. Tosima on July 28, 1981, entitled SURFACE ACOUSTIC WAVE PICK-UP AND RECORDING DEVICE a surface acoustic wave device is disclosed having a substrate tapered to a tip at one end. A fan-shaped interdigital electrode structure having curved fingers is formed on the tip thereof. In the record mode the stylus is brought into contact with the record medium and power is applied to the interdigital electrode. A deformation of the surface of the record medium representative of the information is effected by the stylus tip during the recording operation. Although the Tosima structure may be useful for recording signal information into a surface of the record medium it has certain limitations which may affect the recording operation. For example, the center frequency of the interdigital transducer should be much higher than the recording signal frequency to obtain the wide bandwidth for video recording. In prior art devices a large number of interdigital electrode pair were used, and the carrier signal was amplitude-modulated by the recording signal. Using an interdigital transducer of high frequency seriously affects the amplitude of the SAW generated, i.e., the excited wave has a low surface displacement amplitude. Further, signal reflections from the stylus tip may affect the operation of the cutterhead. Additionally, the surface acoustic wave power that can be generated at the tip of the stylus may be limited due to the geometry of the structure. For example, in the Tosima structure the number of electrode pairs that may be physically positioned on the stylus tip is limited, and the length of the electrode is so small that the power concentration ratio is small.

The present invention overcomes the problems of the prior art by providing a surface acoustic wave device which may be used for real time recording of wide band video signals in a record medium. For example, in a typical video disc system the signals are recorded over a bandwidth of up to 10 MHz. With respect to prior art devices recording signals over this bandwidth in real time is practically impossible. The present invention provides a video disc cutterhead which may record video signals up to 10 MHz having a center frequency of 5 MHz.

In accordance with the principles of the present invention, a surface acoustic wave device is provided for use in recording information in the form of surface variations in a record medium. The device comprises a support having a surface for supporting the propagation of surface acoustic waves and an arcuate electrode formed on said surface of said support. The arcuate electrode is coupled to a signal source and launches surface acoustic waves on said surface of said support. First and second sections of the arcuate electrode include first and second pluralities of electrode finger pairs respectively. The first plurality of electrode finger pairs provides an arcuate electrode having a first frequency characteristic over a predetermined frequency band and the second plurality of electrode finger pairs provides an arcuate electrode having a second frequency characteristic over the predetermined frequency band. These first and second frequency characteristics have conversion loss in a plurality of regions over the predetermined frequency band. In accoordance with the invention the first and second sections of the arcuate electrode are connected to the signal source in a parallel arrangement such that the arcuate electrode has a third frequency characteristic over the predetermined frequency band wherein the conversion loss in the plurality of regions is reduced. The third frequency characteristic has a frequency response characteristic over the predetermined frequency band that is smoother than the frequency response characteristic of the first and second frequency characteristics. Further, the apparatus includes a stylus joining the surface of the support. The arcuate electrode is formed on the surface of the support such that the surface acoustic waves launched therefrom converge to a point on the surface of the support. The stylus joins the surface proximate to that point.

Other features and advantages of the invention will be more fully understood from the following detailed description of the preferred embodiment, the appended claims and accompanying drawing in which:

FIG. 1 is a plan view of a surface acoustic wave device exhibiting the details of the interdigital transducer;

FIG. 2 shows a graph of the energy distribution versus frequency in a typical video disc recording system;

FIG. 3 shows graphs of the conversion loss of certain transducers affixed to surface acoustic wave devices;

FIG. 7 is a side view of the structure shown in FIG. 6;

FIG. 8 is a side view of a surface acoustic wave device exhibiting the principles of the invention;

FIGS. 9, 10 and 11 are detailed views of arcuate structures in accordance with the principles of the present invention;

FIG. 12 shows details of the pattern of surface acoustic waves launched from a single point on the surface of a SAW substrate;

Figure 4:
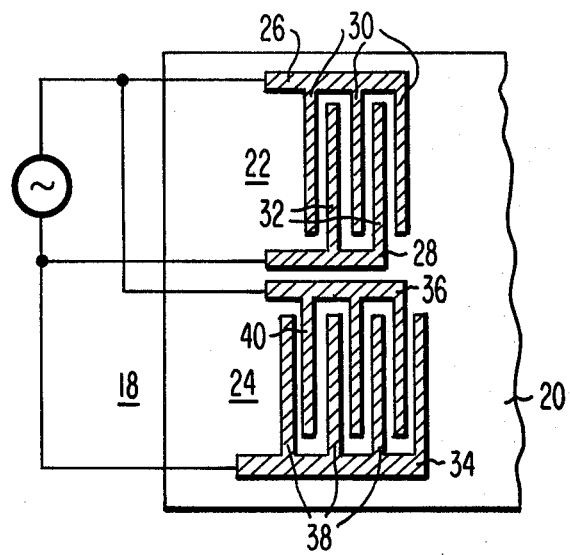
FIG. 4 is a plan view of a surface acoustic wave device exhibiting the details of a pair of interdigital transducers.

The energy in a surface acoustic wave (hereinafter, SAW) is propagated along the surface of a substrate within a layer of about one wavelength thickness. The novel device described herein makes use of the SAW focused to a small region on the surface of a substrate for use in mastering video disc.

The present invention relates to a stylus suitable for use in cutting topographic undulations into the surface of a record medium, for example, a disc-shaped video disc master substrate. Surface acoustic waves generated at video signal frequencies are excited at modest power density levels. The generated SAW are transmitted on the surface of the substrate and concentrated to high power densities at the focus area thereof. These high intensity SAW focused at the focus area drive a cutterhead (i.e., of diamond) in a vibratory state to cut signal elements on the surface of the master substrate.

Referring to FIG. 1, a portion of a plan view of SAW device 1 is illustrated. SAW device 1 comprises substrate 2 which, illustratively, may be formed of a piezoelectric material such as lithium niobate. To excite SAW on the surface of substrate 2 a multi-electrode interdigital transducer 4 is used. Interdigital transducer 4 is deposited on a portion of substrate 2 by techniques well-known in the SAW arts. Electrode 4 includes two conductors 6 and 8 having fingers 10 and 12 respectively. The electrode fingers are interdigitized to form pairs of interlocking conductors. For example, the device shown in FIG. 1 is provided with three and a half pairs of electrode fingers (i.e., three interdigital sections). Pair #1 includes one-half of finger 11, finger 13 and one-half of finger 15; pair #2 includes the other half of finger 15, finger 17 and one-half of finger 19; and pair #3 includes the other half of finger 19, finger 21 and one-half of finger 23. The spacing between successive fingers of electrode 4 may be made equal to one-quarter of the wavelength of the SAW to be excited and center-to-center spacing of successive fingers may be made equal to one-half of the wavelength.

If the interdigital electrode has too many finger pairs the bandwidth of the device may be too narrow. Most video disc systems are broad band, for example, in U.S. Pat. No. 3,842,194 issued on Oct. 15, 1974 to J. K. Clemens a broad bandwidth video disc system is disclosed. The Clemens patent discloses a video disc for use with a playback system of a variable capacitance type. In one configuration of the Clemens system, information representative of recorded picture and sound is recorded in the form of a relief pattern in a relatively fine spiral groove on the surface of a disc record. During playback, capacitance variations between a conductive electrode on a stylus and a conductive property of the disc record are sensed to recover the prerecorded information.

In one particularly successful format for the information track in practice of the Clemens invention, depressed areas extending across the groove bottom alternate with non-depressed areas. In accordance with this method an encoded video signal is additively combined with the accompanying encoded audio signal. The accompanying encoded audio signal is obtained by causing the audio signal to frequency modulate a low frequency sound carrier over a low frequency deviation range (illustratively, 716±50 KHz). The encoded video signal is obtained from a picture modulator wherein the composite color video signal (including luminance signals occupying the given band of frequencies and chrominance signals appearing as sideband components of a modulated chrominance subcarrier interleaved with the luminance signal components in an intermediate region of the given band) is caused to frequency modulate a high frequency picture carrier over a high frequency deviation range (illustratively, 4.3–6.3 MHz). FIG. 2 shows a spectrum plot of the encoded video signal in accordance with the aforementioned preferred Clemens format. The frequency deviation ranges from 4.3 to 6.3 MHz. The sidebands extend over this range from 2 to 9.3 MHz. Most of the energy of the spectrum is between 4.3 and 6.3 MHz. To match the SAW interdigital electrode to the main signal spectrum in accordance with the preferred Clemens format the number of pairs of interdigital sections may be chosen at two or three.

An interdigital transducer having three interdigital sections which is designed having a 5.3 MHz center frequency has a frequency characteristic as shown in FIG. 3. As shown by the solid line 14 the minimum conversion loss for the frequency characteristic of an interdigital electrode having three sections appears at 5.3 MHz. Correspondingly, the curve 14 has infinite conversion loss at the frequencies of 1.77, 3.53, 7.06 and 8.83 MHz. The periodic large conversion loss appearing in the sideband region of the video spectrum may affect the performance of a Clemens type system.

Referring to FIG. 4 the periodic large conversion loss of a surface acoustic wave device may be reduced by connecting two interdigital electrodes having different numbers of electrode finger pairs in a parallel arrangement. A section of a plan view of a SAW device is illustrated. SAW device 18 comprises substrate 20 having interdigital electrodes 22 and 24 formed thereon. Electrode 22 includes two conductors 26 and 28 having fingers 30 and 32 respectively. Electrode 24 includes two conductors 34 and 36 having fingers 38 and 40 respectively. Illustratively, electrode 22 is provided with two interdigital sections and electrode 24 is provided with three interdigital sections. Referring to FIG. 3 again the conversion loss for the electrode 22 having two sections is shown by dash curve 16. The overall conversion loss of the surface acoustic wave device 18 should be much smoother. The combined structure has a conversion loss that is more smooth with fewer regions of high conversion loss. The structure of SAW device 18 has a wideband interdigital transducer which provides better performance for a video disc in accordance with the preferred Clemens format. A small ripple in the frequency performance of the composite interdigital transducer may remain. Any ripple that appears, may be cancelled by adjusting the interdigital transducer electrode length distribution in accordance with apodization techniques well-known in the SAW arts.

Figure 5:
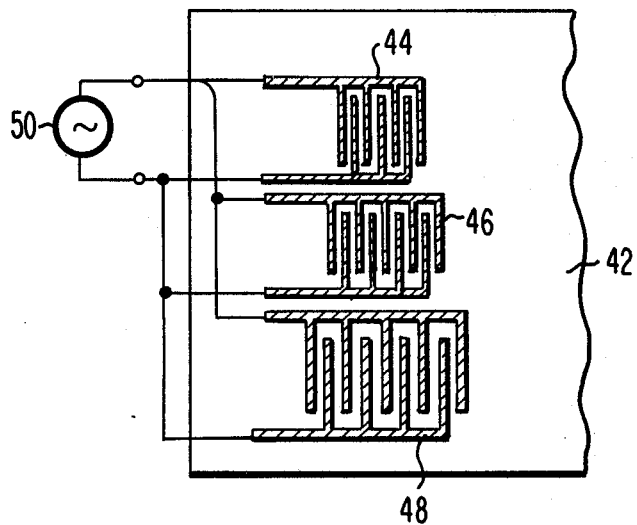
FIG. 5 is a plan view of a surface acoustic wave device exhibiting the details of an interdigital transducer for providing a broad bandwidth response.

The technique used above for providing wideband surface acoustic wave device 18 is just one example of a technique for providing wideband operation for a SAW device. The performance characteristics for a cutterhead in cutting video signals into a disc master involves not only the bandwidth but also the delay time of the device. The delay time should not vary for different frequencies. Referring to FIG. 5, a portion of a SAW device 42 is shown which provides wideband operations without delay time dispersion. Device 42 is provided with three electrodes 44, 46, and 48. Each of the electrodes includes three interdigital sections. To provide wideband operation without delay timed dispersion electrodes 44, 46 and 48 which are connected in parallel to signal source 50 are provided with electrode fingers which are spaced for different center frequencies. For example, electrode 44 may be provided having center frequency $f_1$, electrode 46 having center frequency $f_2$ and electrode 48 having center frequency $f_3$.

Generally, SAW excited on the surface of a piezoelectric substrate are not strong enough to effect cutting of video signals in a master substrate. According to the aforementioned Tosima patent this problem may be overcome by concentrating the SAW generated by the transducer to a narrow tip of the piezoelectric substrate. In the Tosima patent a fan-shaped interdigital transducer is positioned proximate to the tip of the substrate; thus when SAW are excited on the surface of the substrate they are focused to the tip by the fan-shaped electrode.

In the prior art, wideband operation for a SAW device has been achieved by choosing a transducer that provides a center frequency which is much higher than the frequency of interest. This technique may provide wider band operation; however, the penalty, for a cutting stylus, is that the vibrational amplitude at the high frequencies are small.

Figure 6:
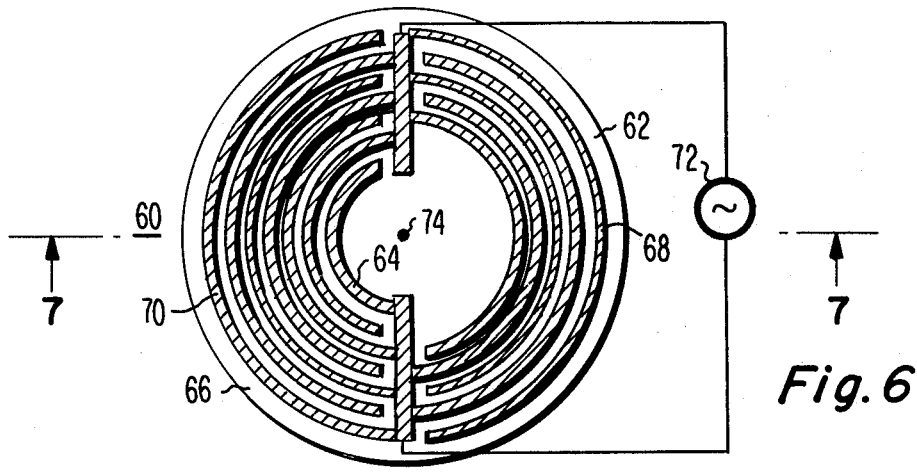
FIG. 6 is a detailed view of the electrode structure on a surface acoustic wave device exhibiting a construction in accordance with the principles of the present invention.

The structure of the present invention obviates these limitations of the prior art. Referring to FIG. 6, a SAW device 60 is shown. SAW device 60 comprises a substrate 62 which may be cylindrical in shape having a circular transducer 64 deposited on a surface 66. Transducer 64 includes a first set of electrode finger pairs 68 (e.g., two interdigital sections) formed in a circular arc having a central angle of approximately 180 degrees and a second set of electrode finger pairs 70 (e.g., three interdigital sections) formed in a circular arc having a central angle of approximately 180 degrees. In operation the transducer is driven by a source of signals 72. SAW generated by electrodes 68 and 70 are concentrated to the center 74 of substrate 62. Referring to FIG. 7, which is a cross sectional view of device 60 taken along lines 7—7 of FIG. 6, a stylus 76 (for example, of diamond) may be cemented at the center of concentration. Mechanical cutting effects a deformation of the surface of a master substrate to provide a record which may be used in a Clemens type video disc system.

Referring to FIG. 8 a cross sectional view of a SAW stylus is shown. In this arrangement the SAW stylus has a cone-shaped SAW propagating surface 78. The cone-shaped surface provides clearance between the stylus base and the recording surface to reduce the chance of debris from the cutting operation forming under the stylus to lift it off of the recording surface.

One of the advantages of the circular transducer as compared to the Tosima structure is that more acoustic power may be concentrated at the cutting tip. In the fan-shaped scheme, the interdigital transducer may be formed on a piezoelectric surface on a diamond stylus. The SAW generated by the transducer propagates toward the sharp stylus tip. At the tip some of the SAW energy is converted to bulk waves and reflected back and another part is reflected in SAW form. Reflections from crystal boundaries may produce peaks and valleys on the input impedance frequency response curve of the device. According to the structure of the present invention no crystal edge exists near the cutting stylus so that little or no reflection from a crystal edge takes place.

In the circular transducer structure, however, the SAW generated in one region of the stylus may pass through the center of the stylus and affect another region of the transducer on the opposite side of the stylus. This passing through effect may adversely affect the operation of the device. One way to reduce this passing through effect is to use a piezoelectric substrate having a suitable attenuation material overlying the surface. For example, a plastic layer (such as cellophane tape) may attenuate the SAW by 20 dB in traveling from one side of the device to the opposite side but only 10 dB at the center point where the stylus is attached.

Referring to FIGS. 9, 10 and 11 other techniques for suppressing the passing through effect are shown. In FIG. 9 a first transducer is positioned on surface 79 in a region having a periphery including an outer circular arc 82 of radius $R_1$, an inner circular arc 83 of radius $R_2$ and two segments of radii 84 and 86. The central angle $\theta$ for the inner and outer circular arcs may be 90 degrees. A second transducer is positioned on surface 79 in a region 88 having a periphery including outer and inner circular arcs 82 and 83 and two segments of radii 86 and 90. Illustratively, the first and second transducers may have two and three interdigital sections respectively. Reflections from the edge of substrate 79 may be minimized or eliminated by using an acoustic absorber 92 (eg., metal or oxide powder cemented by epoxy) positioned near the edge of the substrate. In FIG. 10 a plurality of transducers may be provided on the surface of substrate 94. Arcuate regions 96 having central angles of 30 degrees may include arcuate SAW electrodes of a first electrode finger number pair (eg., 2) and arcuate regions 98 having central angles of 30 degrees may include arcuate SAW electrodes of a second electrode finger number pair (e.g., 3). Absorber material 100 may be positioned near the edge between the electrode regions to absorb acoustic waves which pass through the center 102. In FIG. 11 arcuate regions 104 alternate with arcuate regions 106 on the surface of substrate 108. Arcuate regions 104 include electrodes having a center frequency of $f_1$ and arcuate regions 106 include arcuate electrodes having a center frequency of $f_2$. The SAW generated in regions 104 propagate through the center 110 to the opposite regions 106. Since the transducer in region 104 has a frequency response different from the transducer in region 106 the signals generated in regions 104 are not effectively transduced by the transducers located in regions 106 and visa versa.

One problem with the circular or arcuate electrode structure is that anisotropy effects in the crystal structure may affect the propagation direction of the SAW produced. If the SAW propagation velocity is not uniform, concentration of the wave at the center of the cutterhead may not take place for a circular arcuate electrode. Single crystal material, for example, lithium niobate, is known to have a high piezoelectric constant; however, in this material a circular electrode does not necessarily produce a point of focus because of the anisotropy effects in the crystal structure. FIG. 12 illustrates this situation. Focusing surface acoustic waves at a point 120 from a circular electrode may not be possible. To compensate for the anisotropy of the material the electrode may take on a shape other than circular. Electrode fingers 124 which are shaped in a generally arcuate manner will focus surface acoustic waves 122 to a point 120 on a substrate formed of an anisotropic media.

One technique for determining the electrode shape necessary to focus surface acoustic waves at a point in the center of a substrate will be described with reference to FIG. 13. SAW radiated from a single point will have circular wave fronts on an ideally isotropic and uniform substrate. In practice, however, the wave front will be distorted by the nonuniformities or anisotropies of the substrate. The reciprocity of the SAW permits one to work backwards to determine the transducer shape. By measuring the shape of the wave front generated from a single point, for example, from the point where the stylus will be mounted on a SAW substrate, a transducer may be laid down in the shape of the measured wave front to provide a transducer that will focus SAW to the point where the stylus is to be positioned.

Figure 13:
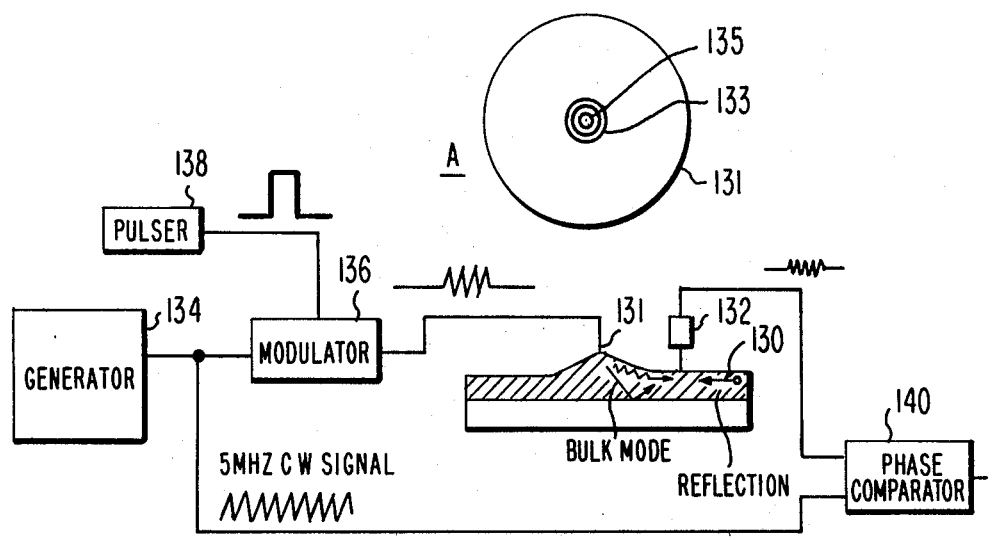
FIG. 13 is a representation partially in block diagram form, of an apparatus for use in determining the shape and position of an electrode structure on a anisotropic substrate.

Referring to FIG. 13, small circular transducers 133 and 135 are deposited on the top flat region of a mountain-shaped piezoelectric substrate 130 to provide point 131 from which to launch SAW. SAW are radiated from point 131 in a radial direction along the surface of substrate 130. An enlarged top view of the flat region 131 is shown by inset A. A capacitive probe 132 senses the surface voltage generated on the piezoelectric material due to the SAW. An RF signal is generated by signal source 134, illustratively, signal source 134 generates a CW wave of 5 MHz frequency. Modulator 136 passes SAW waves in short pulse durations in response to pulses from wave generator 138. The SAW signal is sensed by probe 132 with a certain delay time determined by the SAW propagation velocity and the propagation distance. Spurious signals, such as edge reflected SAW or bulk mode waves, will have different delay times so that their effect may be excluded. The signal from the capacitive probe is fed to one input port of phase comparator 140. The CW signal from the signal source 134 is fed into the other input port of phase comparator 140. The phase relationship between the two input ports is measured by the output voltage. In operation the substrate may be placed on an x-y plane and a pattern showing constant SAW phase on the surface of the substrate may be determined. Motion of the x-y plane may be measured by an x-y motional table having very fine resolution, such as a few micrometers. A constant phase line would be ideally circular if the substrate is ideally uniform and isotropic. In general, however, the pattern will be deformed from the ideally circular pattern. After measuring the constant phase lines which are related to the propagating wave front pattern an electrode may be deposited on the substrate surface along the constant phase lines.

Figure 14:
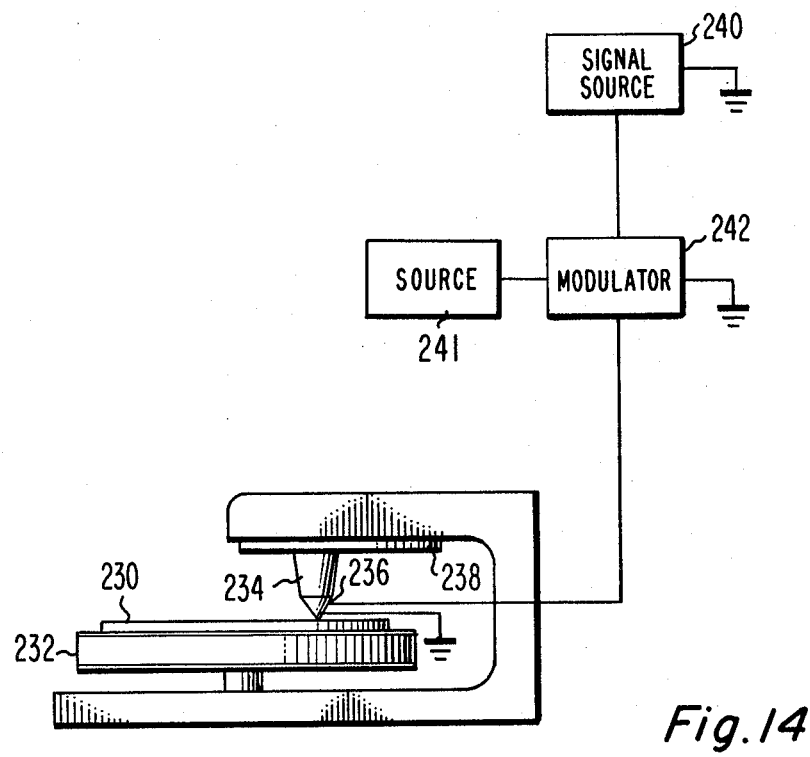
FIG. 14 is a representation, partially in block diagram form, of a SAW recording apparatus suitable for use in formation of an information record.

An explanation of the operation of a SAW device to cut undulations into a master substrate surface for use in video discs will now be provided with reference to FIG. 14. A master substrate 230 (illustratively, of copper) is placed on movable support 232 (i.e., turntable) in operating relationship with SAW cutterhead 236. SAW cutterhead 236 may be of a type described with reference to FIGS. 7 and 8). In this arrangement the support base of SAW cutterhead 236 may be attached to pedestal 234. The cutting stylus positioned on the end of cutterhead 236 is positioned with respect to master 230 in order to cut a groove having a quiescent groove depth of less than one micrometer while relative motion is established between substrate 230 and cutterhead 236. In one preferred arrangement, pedestal 234 is moved linearly on slide 238 while turntable 232 is rotated such that cutterhead 236 cuts a spiral groove in a disc-shaped substrate 230.

Video signals (along with accompanying audio signals) from a source 240 are applied via modulator 242 to cutterhead 236 to effect short wavelength modulation of the groove depth. Modulator 242 is supplied with a continuous wave signal of approximately 5 MHz from CW Source 241. In operation the video signals from source 240 modulate the carrier supplied from source 241. In the record mode the power applied to cutterhead 236 is sufficient to effect a modulation of the groove depth representative of the information to be recorded.

After recording, the master substrate 230 has a relief pattern corresponding to that which is desired in the final record. Stampers which are used to produce production line records are made from the substrate and a vinyl record having the desired relief pattern for consumer use is formed from the stamper.

Other arrangements for the electrode structure or the shape of the stylus tip for use in recording video signals are possible. For example, in a patent application filed concurrently herewith for M. Toda et al. entitled, TRAVELING WAVE TYPE SURFACE ACOUSTIC WAVE TRANSDUCER a delay line technique is used to broaden the bandwidth of the recording device. Successive electrodes on the SAW device are driven by successive time delayed signals. The signal speed propagating along the delay line is chosen to be equal to the SAW propagation speed. In accordance with another stylus tip structure a pyramidal-shaped tip is disclosed in an application filed concurrently herewith for S. Tosima et al. entitled, A SURFACE ACOUSTIC WAVE DEVICE HAVING A PYRAMID SHAPE FOR RECORDING VIDEO INFORMATION ON A SUBSTRATE. In the Tosima application a plurality of transducers are formed on the triangular surfaces of a pyramidal-shaped structure. Surface acoustic waves launched from the transducers are focused at the apex of the pyramid. Vibratory motion of a stylus positioned at the apex is effected by the acoustic waves.

It should be clear from the foregoing that styli made in accordance with the present invention are useful in video disc systems other than the Clemens type. For example, the video disc system may be of a groove or flat record system type.

What is claimed is:

1. In a record system for recording information in the form of surface variations in a record medium, a surface acoustic wave device comprising:
   a support having a surface for supporting the propagation of surface acoustic waves;
   an arcuate electrode formed on said surface of said support, said arcuate electrode being coupled to a signal source and being provided for launching surface acoustic waves on said surface of said support, said arcuate electrode including at least first and second sections, said first and second sections of said arcuate electrode having first and second pluralities of electrode finger pairs respectively, said first plurality of electrode finger pairs providing an arcuate electrode having a first frequency characteristic over a predetermined frequency band and said second plurality of electrode finger pairs providing an arcuate electrode having a second frequency characteristic over said predetermined frequency band, said first and second frequency characteristics having conversion loss in a plurality of regions over said predetermined frequency band, said first and second sections of said arcuate electrode being connected to said signal source in a parallel arrangement such that said arcuate electrode has a third frequency characteristic over said predetermined frequency band wherein said conversion loss in said plurality of regions is reduced; said third frequency characteristic having a frequency response characteristic over said predetermined frequency band that is smoother than the frequency response characteristic of said first or said second frequency characteristics; and
   a stylus joining said surface of said support;
   said arcuate electrode being formed on said surface of said support such that surface acoustic waves launched therefrom converge substantially to a point on said surface of said support, said stylus joining said surface proximate to said point.

2. The surface acoustic wave device according to claim 1 wherein said arcuate electrode is substantially circular in shape.

3. The surface acoustic wave device according to claim 2 wherein said first plurality of electrode finger pairs comprises at least two finger pairs and said second plurality of electrode finger pairs comprises at least three finger pairs.

4. The surface acoustic wave device according to claim 3 wherein said signal source provides signals having a bandwidth up to 10 MHz.

5. In a record system for recording information in the form of surface variations in a record medium, a surface acoustic wave device comprising:
   a support having a surface for supporting the propagation of surface acoustic waves;
   a transducer comprising a plurality of arcuate electrode sections formed on said surface of said support, each of said plurality of arcuate electrode sections being coupled to a signal source and being provided for launching surface acoustic waves on said surface of said support, each of said plurality of arcuate electrode sections including at least first and second segments, said first and second segments of said plurality of arcuate electrodes having first and second pluralities of electrode finger pairs respectively, said first plurality of electrode finger pairs providing an arcuate electrode having a first frequency characteristic over a predetermined frequency band and said second plurality of electrode finger pairs providing an arcuate electrode having a second frequency characteristic over said predetermined frequency band, said first and second frequency characteristics having conversion loss in a plurality of regions over said predetermined frequency band, said first and second segments being connected to said signal source in a parallel arrangement such that said transducer has a third frequency characteristic over said predetermined frequency band wherein said conversion loss in said plurality of regions is reduced, said third frequency characteristic having a frequency response characteristic that is smoother than the frequency response characteristic of said first or said second frequency characteristic; and
   a stylus joining said surface of said support;
   said transducer being formed on said surface of said support such that surface acoustic waves launched therefrom converge substantially to a point on said surface of said support, said stylus joining said surface proximate to said point, each of said plurality of arcuate electrode sections being positioned on said surface such that surface acoustic waves launched from one of said plurality of arcuate electrode sections is not incident on any other of said plurality of arcuate electrode sections.

6. The surface acoustic wave device according to claim 5 wherein said transducer is substantially circular in shape.

7. The surface acoustic wave device according to claim 6 wherein said first plurality of electrode finger pairs comprises at least two finger pairs and said second plurality of electrode finger pairs comprises at least three finger pairs.

8. The surface acoustic wave device according to claim 7 wherein said signal source provides signals having a bandwidth up to 10 MHz.

9. In a record system for recording information in the form of surface variations in a record medium, a surface acoustic wave device comprising:
a support having a surface for supporting the propagation of surface acoustic waves;
first and second regions on said surface defining areas including first and second portions of a surface acoustic wave transducer, said first and second regions having peripheries including an inner circular arc of a first predetermined diameter, an outer circular arc of a second predetermined diameter and two segments of radii extending from said inner circular arc to said outer circular arc, said radii having an origin at the center of said inner circular arc and a central angle formed therebetween of a predetermined magnitude;
said first and second portions of said surface acoustic wave transducer including arcuate electrodes, said arcuate electrodes being coupled to a signal source and being provided for launching surface acoustic waves on said surface of said support, and
a stylus joining said surface of said support;
said arcuate electrodes being formed on said surface of said support such that surface acoustic waves launched therefrom converge substantially to a point on said surface of said support, said stylus joining said surface proximate to said joint.

10. The surface acoustic wave device according to claim 9 wherein said predetermined magnitude of said central angle is equal to 180°.

11. The surface acoustic wave device according to claim 9 wherein said predetermined magnitude of said central angle is equal to 90°.

12. The surface acoustic wave device according to claim 9 wherein said predetermined magnitude of said central angle is equal to 30°.

13. The surface acoustic wave device according to claim 9 further including:
third and fourth regions on said surface of said support defining areas including third and fourth portions of said surface acoustic wave transducer, said third and fourth regions having peripheries substantially equal to said peripheries of said first and second regions; and
said third and fourth portions of said surface acoustic wave transducer including arcuate electrodes, said arcuate electrodes being coupled to said signal source and being provided for launching surface acoustic waves on said surface of said support.

14. The surface acoustic wave device according to claim 13 wherein said first region is located on said surface of said support adjacent to said second region; said third region is located on said surface of said support adjacent to said fourth region and said second region is separated from said third region by an angular displacement of a predetermined magnitude, said angular displacement being measured from said origin.

15. The surface acoustic wave device according to claim 14 further including:
fifth and sixth regions on said surface of said support defining areas including fifth and sixth portions of said surface acoustic wave transducer, said fifth and sixth regions having peripheries substantially equal to said peripheries of said first and second regions; and
said fifth and sixth portions of said surface acoustic wave transducer including arcuate electrodes, said arcuate electrodes being coupled to said signal source and being provided for launching surface acoustic waves on said surface of said support.

16. The surface acoustic wave device according to claim 15 wherein said fifth region is located on said surface of said support adjacent to said sixth region and said fifth region is separated from said fourth region by an angular displacement of a predetermined magnitude, said angular displacement being measured from said origin.

17. The surface acoustic wave device according to claim 16 wherein said predetermined magnitude of said central angle is equal to 30°, said angular displacement separating said second and said third regions is equal to 60° and said angular displacement separating said fourth and said fifth regions is equal to 60°.

18. An improved record arrangement for recording information in the form of surface variations in a record medium, said arrangement including a surface acoustic wave device comprising:
mechanical coupling means coupled to said surface and adapted to be coupled to the record medium for causing surface variations therein in response to said surface acoustic waves;
an arcuate first electrode formed on said surface and adapted to be coupled to a source of information signals for launching surface acoustic waves in a pattern converging near said mechanical coupling means, said first electrode being configured to have a first predetermined conversion loss as a function of frequency including frequencies at which high conversion loss the improvement comprising:
an arcuate second electrode formed on said surface and coupled in a parallel arrangement with said first electrode so as to be driven by said source for launching surface acoustic waves in a pattern converging near said mechanical coupling means, said second electrode being configured to have a second predetermined conversion loss as a function of frequency such that relatively low conversion loss occurs at at least some of said frequencies at which said first electrode has high conversion loss whereby the overall frequency response of said paralleled first and second electrodes has fewer regions of high conversion loss that that of said first electrode above.

19. The surface acoustic wave device according to claim 18 wherein said information is recorded over a frequency range of up to 10 MHz.

* * * * *